(12) United States Patent
Stacey et al.

(10) Patent No.: US 11,911,832 B2
(45) Date of Patent: Feb. 27, 2024

(54) BACKSET ADJUSTER FOR A DOOR LOCKSET JIG

(71) Applicant: APEX BRANDS, INC., Apex, NC (US)

(72) Inventors: Maxwell Daniel Stacey, Lexington, SC (US); Jeremy Hickman, Columbia, SC (US)

(73) Assignee: Apex Brands, Inc., Apex, NC (US)

( * ) Notice: Subject to any disclaimer, the term of this patent is extended or adjusted under 35 U.S.C. 154(b) by 74 days.

(21) Appl. No.: 17/677,038

(22) Filed: Feb. 22, 2022

(65) Prior Publication Data
US 2022/0274188 A1    Sep. 1, 2022

Related U.S. Application Data

(60) Provisional application No. 63/154,086, filed on Feb. 26, 2021.

(51) Int. Cl.
*B23B 47/28* (2006.01)
*E05B 17/06* (2006.01)

(52) U.S. Cl.
CPC ........ *B23B 47/287* (2013.01); *B23B 2247/06* (2013.01); *E05B 17/06* (2013.01)

(58) Field of Classification Search
CPC ... B23B 47/287; B23B 2247/06; E05B 17/06; E04F 21/003
See application file for complete search history.

(56) References Cited

U.S. PATENT DOCUMENTS

| 2,679,771 A | 6/1954 | Schlage |
| 4,248,554 A * | 2/1981 | Boucher ............... B23B 47/28 408/241 B |
| 4,813,826 A | 3/1989 | Riedel |
| 5,222,845 A | 6/1993 | Goldstein et al. |
| | (Continued) | |

FOREIGN PATENT DOCUMENTS

| EP | 0498510 A1 | 8/1992 | |
| GB | 2546102 A * | 7/2017 | ........... B23B 47/287 |
| WO | 0220204 A1 | 3/2002 | |

OTHER PUBLICATIONS

International Search Report and Written Opinion of International application No. PCT/US2022/017800 dated May 20, 2022, all pages cited in its entirety.

*Primary Examiner* — Eric A. Gates
(74) *Attorney, Agent, or Firm* — Burr & Forman LLP (57) ABSTRACT

A cutting guide apparatus for guiding placement of bore holes in a door may include an engagement interface and a backset assembly. The engagement interface may be configured to retain the apparatus proximate to an edge of a door. The engagement interface may include a handle hole guide structure and an edge bore guide structure. The backset assembly may be operably coupled to the engagement interface to enable an amount of backset from the edge of the door to a center of the handle hole guide structure to be adjusted. The engagement interface may include a first leg configured to be disposed along a first face of the door, and a second leg configured to be disposed along a second face of the door. The backset assembly may be configured to engage the edge of the door at a variable location between the first and second legs.

14 Claims, 7 Drawing Sheets

(56) References Cited

U.S. PATENT DOCUMENTS

| | | | |
|---|---|---|---|
| 6,398,465 B1 * | 6/2002 | Monge | B27F 5/12 |
| | | | 279/143 |
| D516,401 S * | 3/2006 | Snider | D8/70 |
| 7,356,902 B2 | 4/2008 | Snider et al. | |
| 9,850,670 B2 | 12/2017 | Ward | |
| 10,835,966 B1 * | 11/2020 | Qi | B23B 47/287 |
| 2007/0041800 A1 | 2/2007 | Santos | |
| 2007/0110528 A1 | 5/2007 | Chao | |
| 2009/0279968 A1 | 11/2009 | Kiezel | |
| 2012/0017452 A1 | 1/2012 | Lam et al. | |
| 2016/0325361 A1 | 11/2016 | Trettin et al. | |
| 2018/0112418 A1 | 4/2018 | Ward | |
| 2020/0141153 A1 | 5/2020 | Sawa et al. | |

* cited by examiner

ns with the door itself is fairly standard. In this regard, a bore hole is typically provided through the door to define a handle hole that passes from the inside to the outside surface of the door. The handle hole is located proximate to the opposite side of the door from the hinge assembly, and is typically at about waist height for an average person. Meanwhile, another bore hole (e.g., a "cross bore" or "edge bore") is provided perpendicular to the handle hole to receive the bolt or latch of the door handle assembly.

BACKSET ADJUSTER FOR A DOOR LOCKSET JIG

TECHNICAL FIELD

Example embodiments generally relate to carpentry devices, and more particularly relate to a lockset jig for a door.

BACKGROUND

Door handle assemblies, that include door handles and/or locksets can vary widely in their outward appearances, and even to some degree in functional capability. However, the way the door handle assemblies interface with the door itself is fairly standard. In this regard, a bore hole is typically provided through the door to define a handle hole that passes from the inside to the outside surface of the door. The handle hole is located proximate to the opposite side of the door from the hinge assembly, and is typically at about waist height for an average person. Meanwhile, another bore hole (e.g., a "cross bore" or "edge bore") is provided perpendicular to the handle hole to receive the bolt or latch of the door handle assembly.

The edge bore must intersect with the handle hole, which is normally 2 and 1/8 inches in diameter. To ensure that this intersection occurs, and that the handles can properly and functionally connect to the bolt/latch, the handle hole must be spaced properly from the edge of the door. This spacing is referred to as "backset" and normally is again standard at one of either 2 and 3/8 inches or 2 and 3/4 inches from the edge of the door. In order to provide this proper spacing in a consistent fashion, a jig may be used. The jig is typically attached to the edge of the door, and then provides for the specific locations at which a hole saw may be used to cut the handle hole, and also cut the bolt/latch hole with two correspondingly different sized hole saws.

In many cases, different jigs may be required to accommodate the different backset options of 2 and 3/8 inches or 2 and 3/4 inches. Moreover, the hole saws can often damage the jigs at the edges of the bore hole when the hole saw cuts through the door. Thus, there remains a desire to improve current jig designs to eliminate these and other problems.

BRIEF SUMMARY OF SOME EXAMPLES

Some example embodiments may enable the provision of a cutting guide apparatus for guiding placement of bore holes in a door. The apparatus may include an engagement interface and a backset assembly. The engagement interface may be configured to retain the apparatus proximate to an edge of a door. The engagement interface may include a handle hole guide structure and an edge bore guide structure. The backset assembly may be operably coupled to the engagement interface to enable an amount of backset from the edge of the door to a center of the handle hole guide structure to be adjusted. The engagement interface may include a first leg configured to be disposed along a first face of the door, and a second leg configured to be disposed along a second face of the door. The backset assembly may be configured to engage the edge of the door at a variable location between the first and second legs.

In another example embodiment, a backset assembly for a cutting guide apparatus configured to guide placement of bore holes in a door may be provided. The backset assembly may include a contactor, a passage and arms. The contactor may be disposed between a first leg and a second leg of the apparatus and proximate to a spacing element that separates the first and second legs. The first leg may be configured to be disposed along a first face of the door, and the second leg may be configured to be disposed along a second face of the door. The spacing element may have an inside face configured to be disposed to face the edge of the door. The passage may be formed in a center portion of the contactor and may pass through the contactor to enable a hole saw to pass through the passage to cut an edge bore in the door. The arms may be disposed at opposing edges of the contactor. The arms may extend out of a plane in which the contactor lies toward the inside face. The backset assembly may be configured to adjust a distance between the edge and the inside face by moving a position of the contactor relative to the inside face.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 2, which is defined by FIGS. 2A and 2B, illustrates perspective views of one example implementation of the cutting guide apparatus of FIG. 1 in accordance with an example embodiment;

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may relate to the provision of a handle assembly installation jig (or simply, a "jig") that may have an improved configuration that prevents damage to the jig by routine usage, and that also has improved structures for interfacing with doors of any width, while enabling different selectable backsets to be employed. The jig is an example of a cutting guide apparatus that guides operation of a cutting tool (e.g., a hole saw) for the formation of an edge bore and a handle bore in a door.

Figure 1:
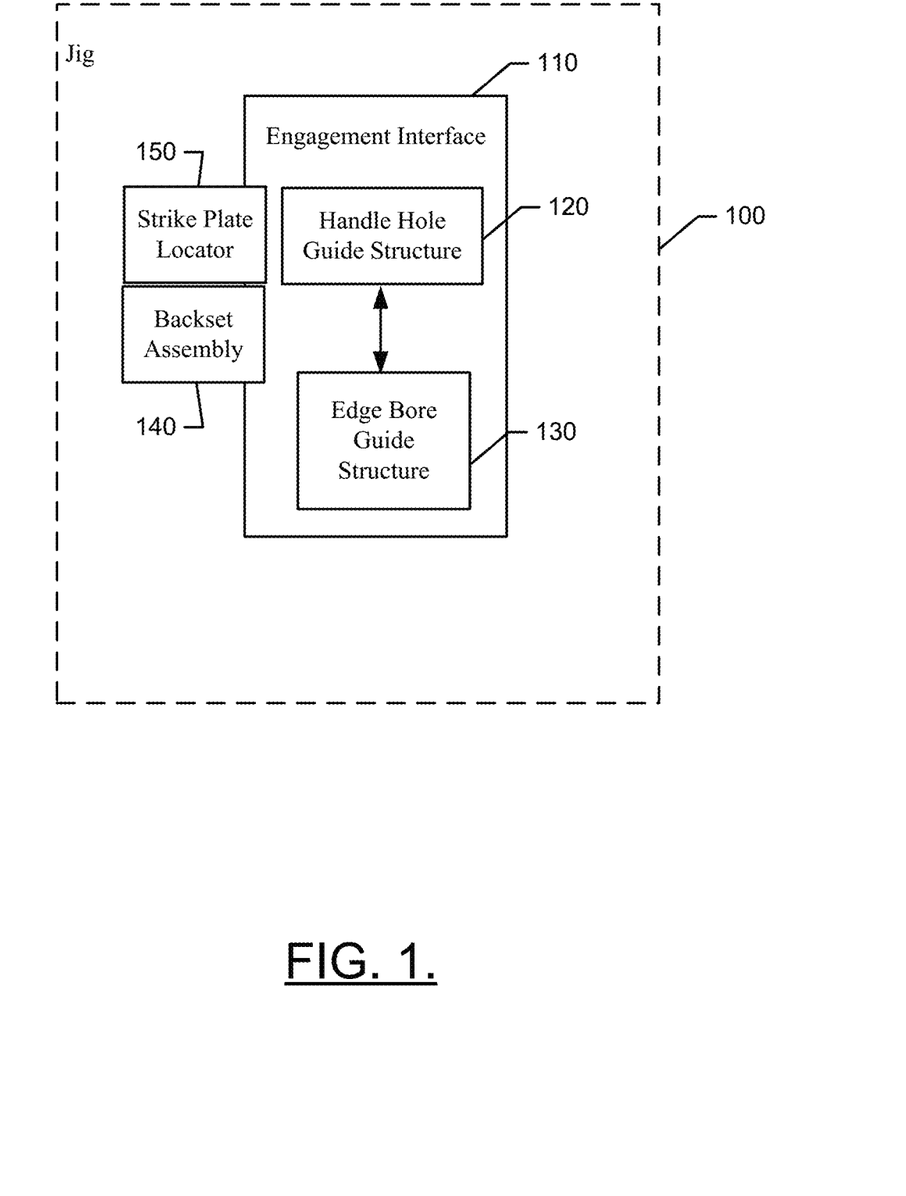
FIG. 1 illustrates a block diagram of a cutting guide apparatus for guiding placement of bore holes in a door in accordance with an example embodiment.
Figure 2A:
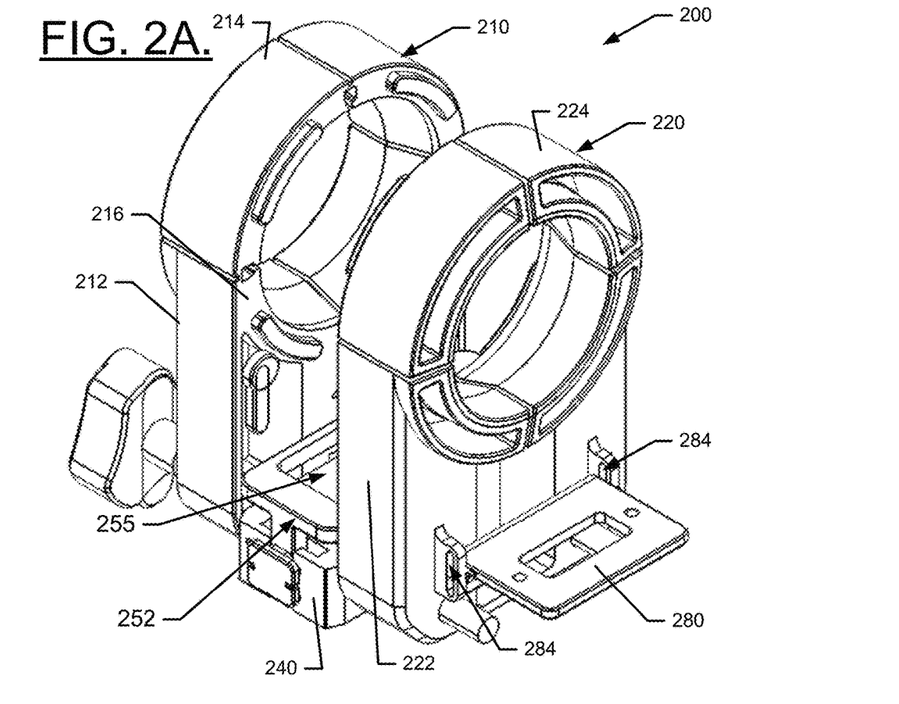
Figure 2B:
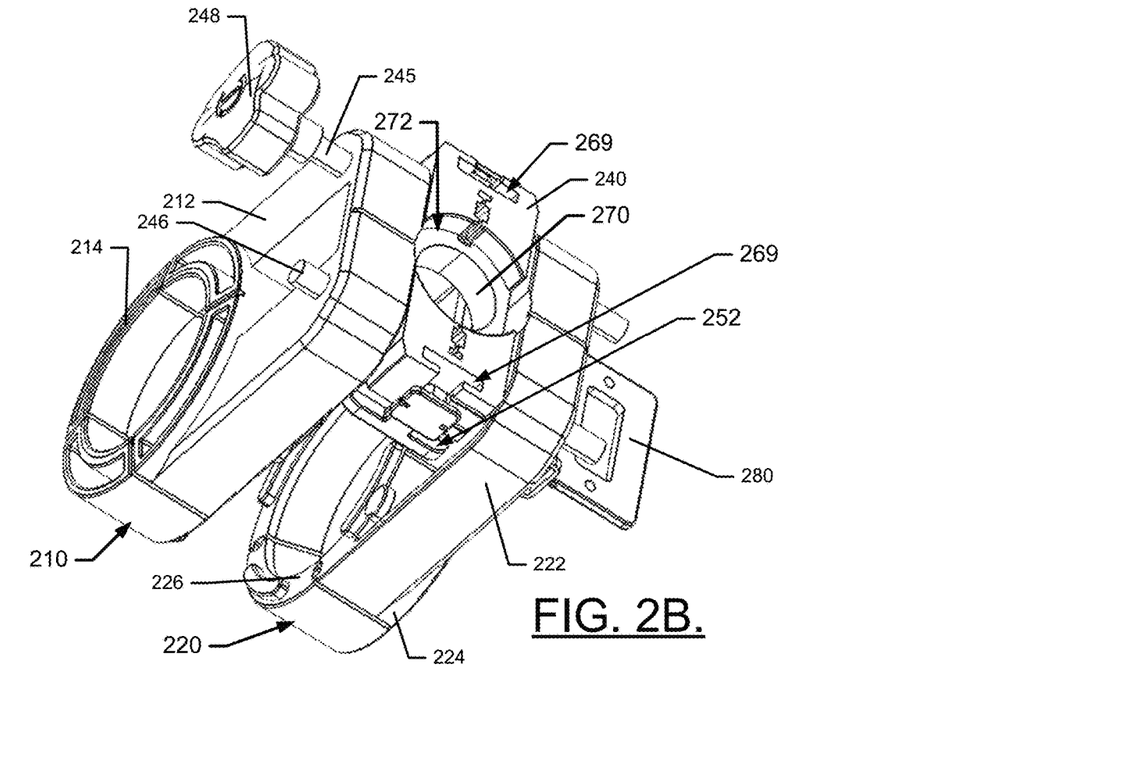

FIG. 1 illustrates a block diagram of a cutting guide apparatus in the form of a jig 100 of an example embodiment. The jig 100 includes an engagement interface 110 that enables the jig 100 to be temporarily attached to the edge of a door. The engagement interface 110 of an example embodiment may be adjustable to enable the jig 100 to be used with doors that have different thicknesses (defined between the inside and outside faces of the door). The jig 100 also includes a handle hole guide structure 120 and an edge bore guide structure 130. In some cases, the handle hole guide structure 120 and the edge bore guide structure 130 may be operably coupled to each other, and may also be portions of the engagement interface 110. As will be discussed in greater detail below, the handle hole guide structure 120 may include structural improvements that prevent damaging the jig 100 during routine usage with a hole saw to cut the handle hole. Meanwhile, the edge bore guide structure 130 may also include structural improvements that enable the edge bore to be cut even with hole saws that have an arbor size that is larger than a diameter of the edge bore itself.

The jig 100 may also include a backset assembly 140 that enables different backsets (e.g., 2 and ⅜ inches or 2 and ¾ inches) to be supportable with only minor operator action. The backset assembly 140 of some embodiments may be operably coupled to the engagement interface 110. Thus, for example, the backset assembly 140 may be operably coupled to the edge bore guide structure 130. In an example embodiment, the jig 100 may also include a strike plate locator 150. The strike plate locator 150 may be operably coupled to the engagement interface 110 and/or the backset assembly 140 in some cases. Some, any or all of these improvements may be included in the jig 100. Moreover, it will be appreciated that different specific structures can be used to implement some of these improvements. Accordingly, although specific structures will be shown to illustrate some example structures that may be used to implement example embodiments, those specific structures should not be viewed as being limiting.

Figure 3:
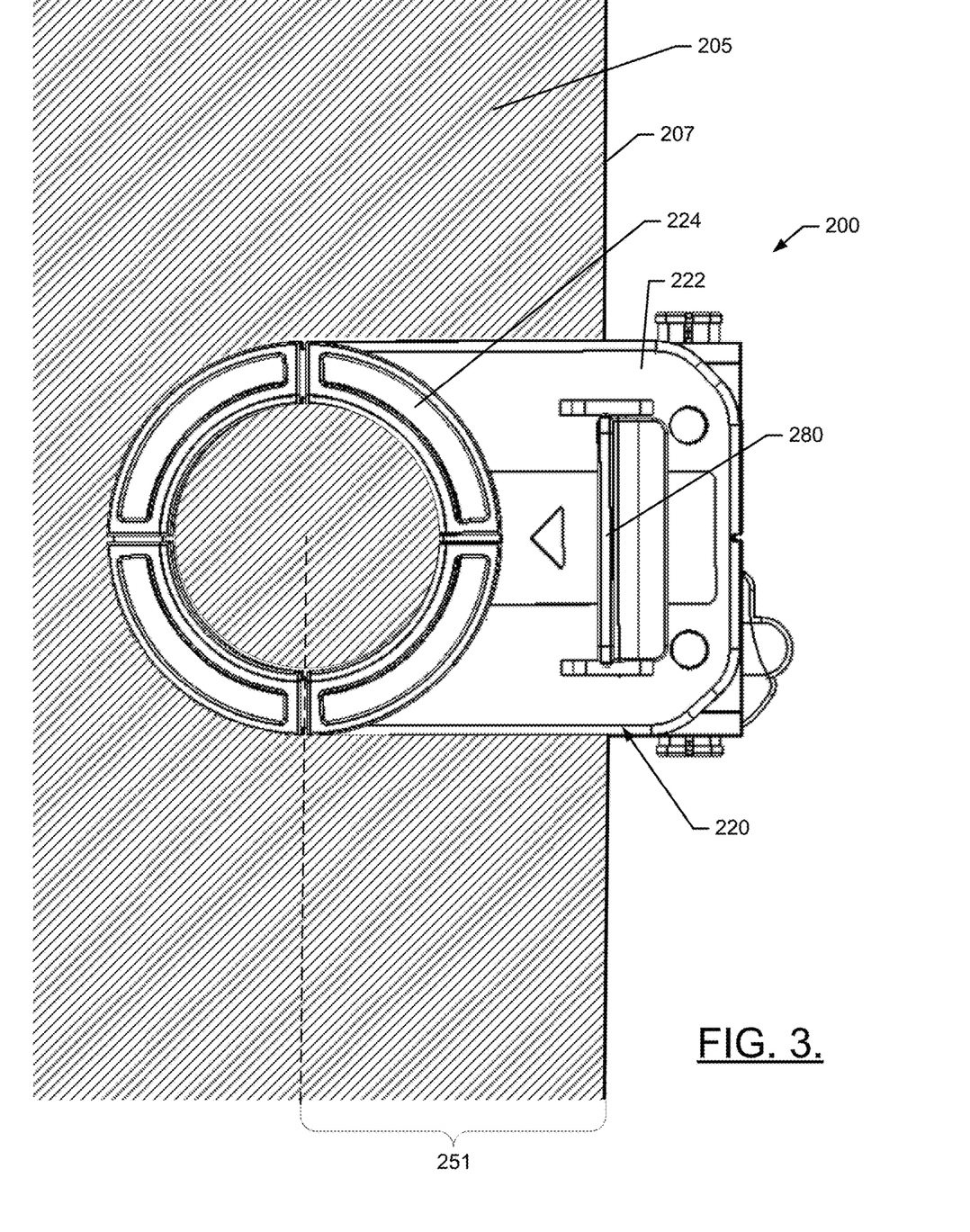
FIG. 3 is a side view of the cutting guide apparatus disposed on a door in accordance with an example embodiment.
Figure 4:
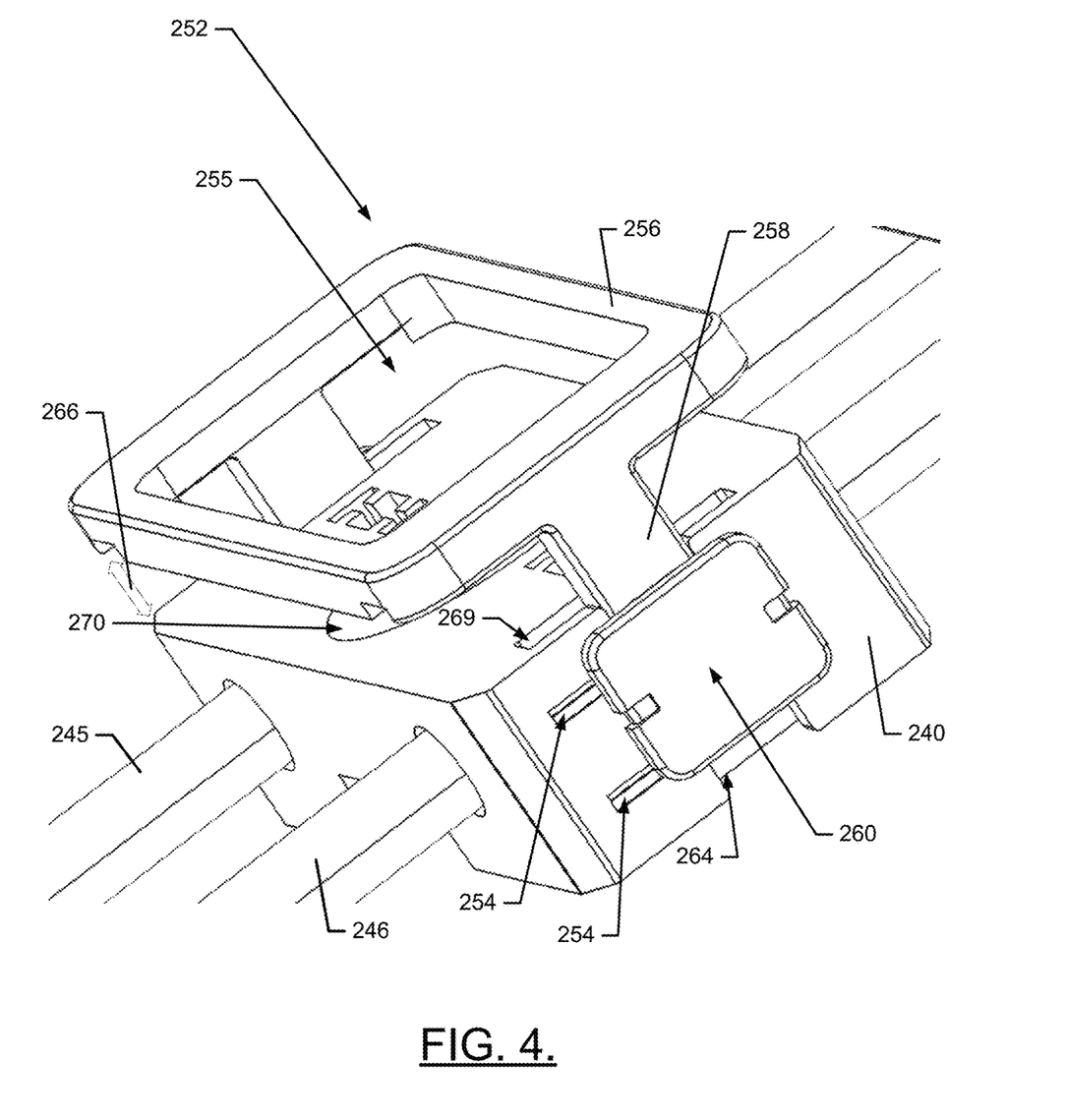
FIG. 4 is a perspective view of a backset assembly in accordance with an example embodiment.
Figure 5:
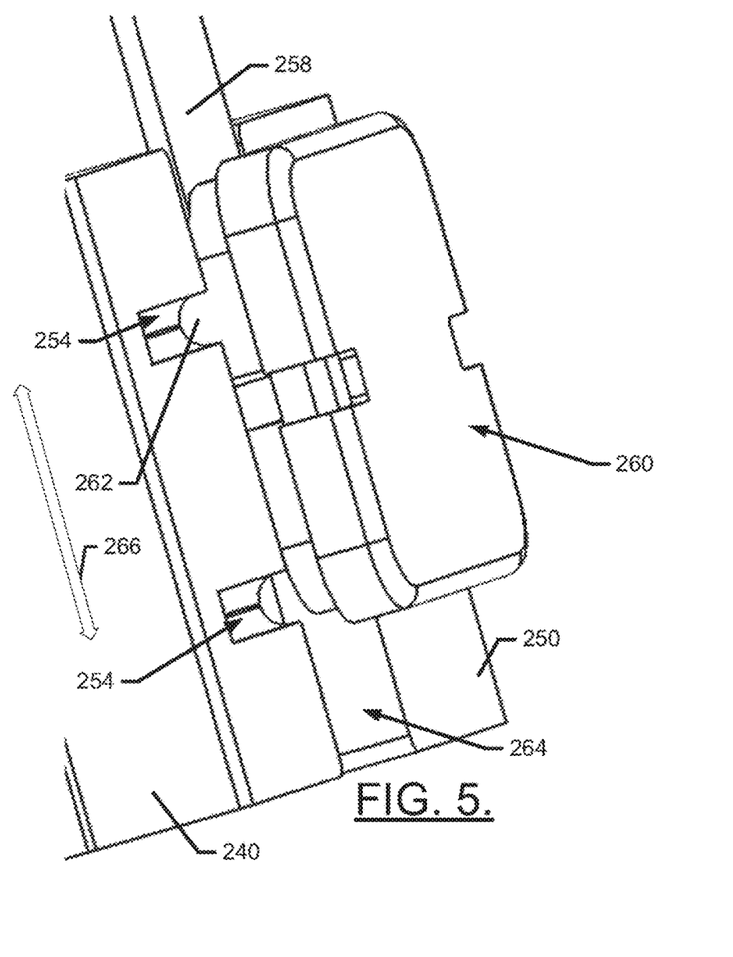
FIG. 5 is a perspective view of an engagement tab in accordance with an example embodiment.
Figure 6:
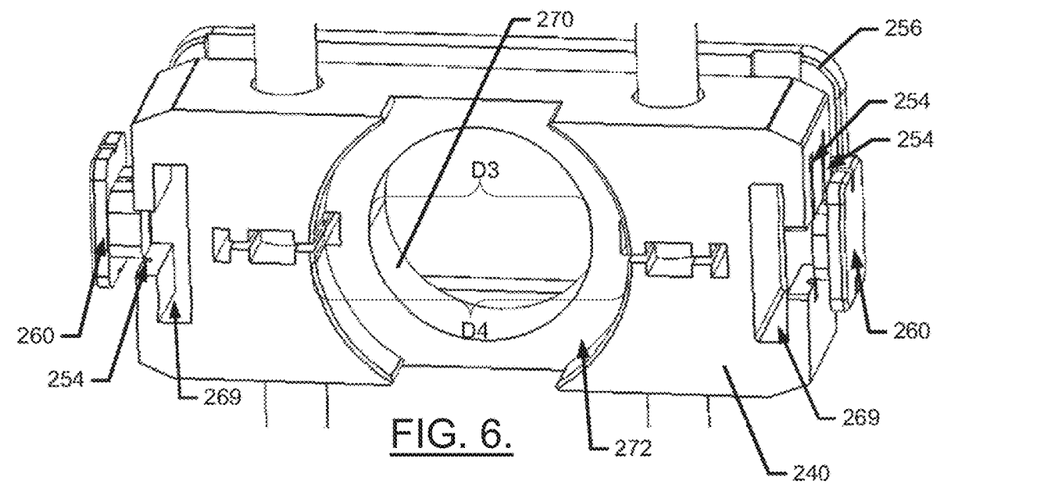
FIG. 6 is a perspective view of a spacing element according to an example embodiment.
Figure 7:
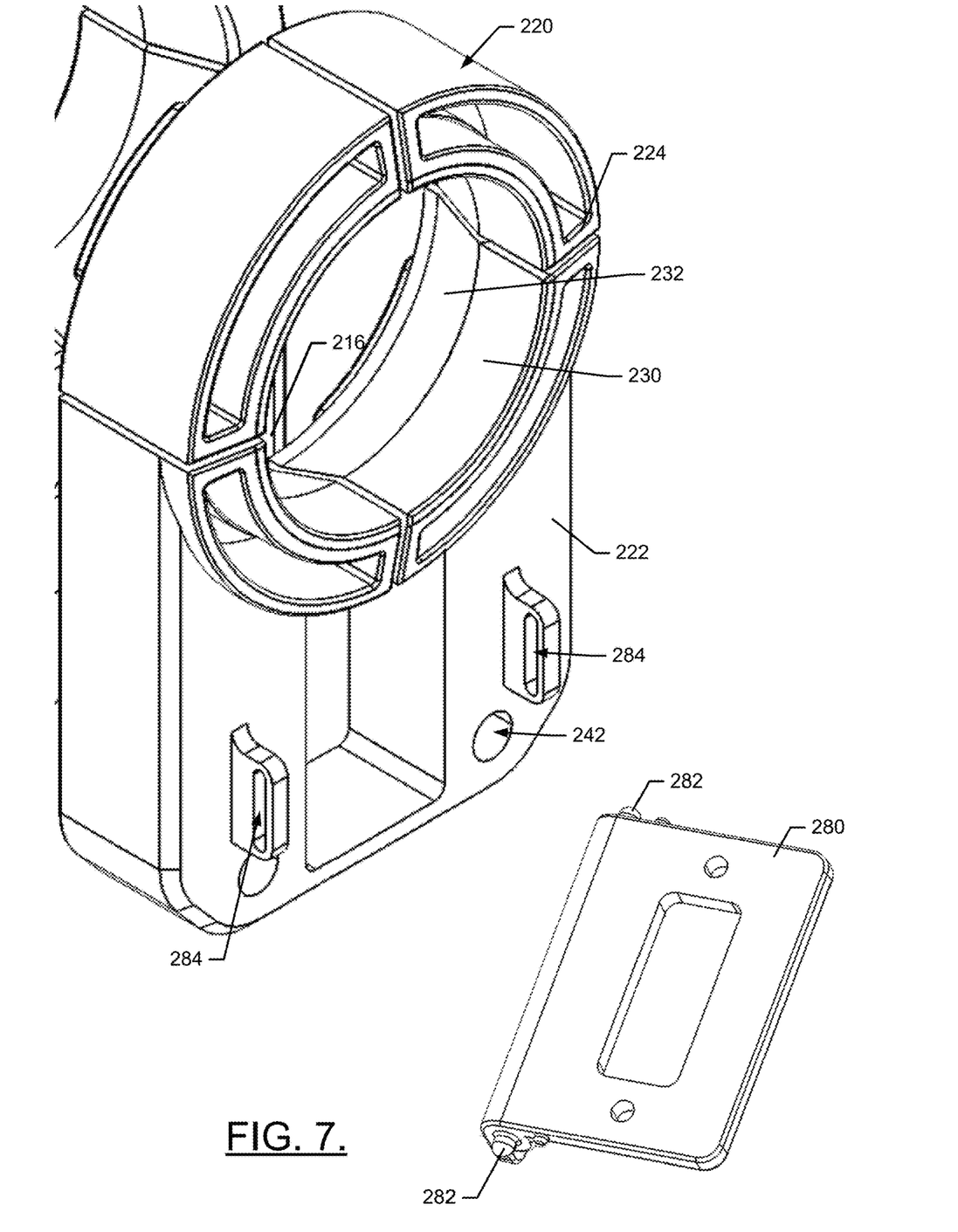
FIG. 7 is a perspective view of a strike plate locator in accordance with an example embodiment.
Figures 8A, 8B, 8C:
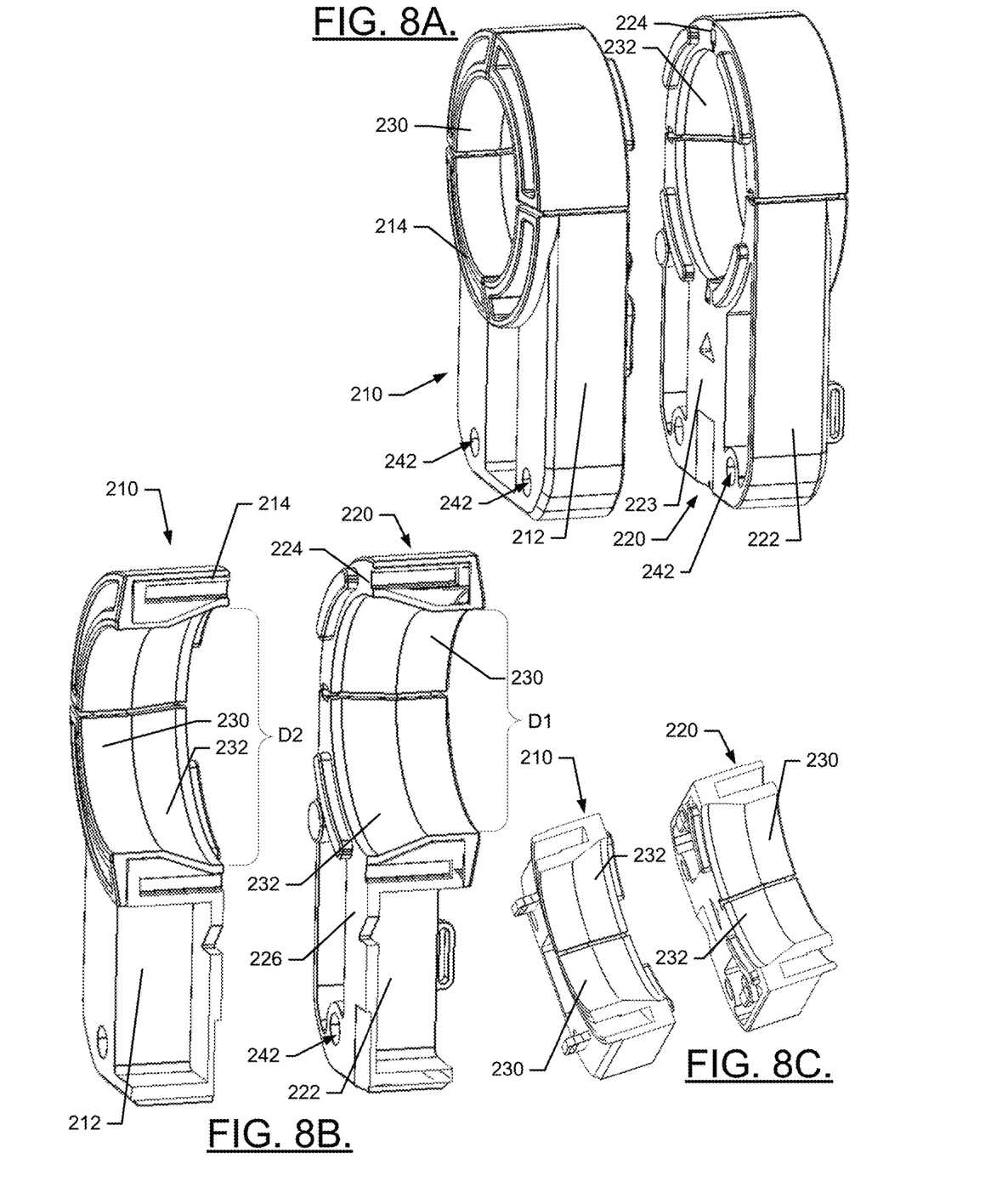
FIG. 8A is a perspective view of the first and second legs of the cutting guide apparatus in isolation according to an example embodiment.
FIG. 8B shows the first and second legs of FIG. 8A in cross section bisecting the first and second legs laterally according to an example embodiment.
FIG. 8C shows the first and second legs of FIG. 8A in cross section bisecting the first and second legs longitudinally of each of the first and second legs according to an example embodiment.

FIGS. 2-8 will now be described to illustrate one example structure that may be used to instantiate example embodiments of the jig 100 of FIG. 1. In this regard, FIG. 2, which is defined by FIGS. 2A and 2B, shows two different perspective views of a jig 200 that is one example of the jig 100 of FIG. 1. FIG. 3 is a side view of the jig 200 attached to a door 205. FIG. 4 illustrates a perspective view of components that may form an example of the backset assembly 140 of FIG. 1. Meanwhile, FIG. 5 illustrates a perspective view of components that may instantiate the backset assembly 140 of FIG. 1 according to an example embodiment. FIG. 6 shows a structure for enabling a larger arbor than the diameter of the edge bore to be used. FIG. 7 shows structures for a hingedly attached strike plate locator. FIG. 8, which is defined by FIGS. 8A, 8B and 8C shows various views of a bore undercut in accordance with an example embodiment.

Referring now to FIGS. 2-8, the jig 200 may include a first leg 210 and a second leg 220. The first and second legs 210 and 220 may each include a base portion (i.e., base portions 212 and 222, respectively) and a bore collar (i.e., bore collars 214 and 224, respectively). The base portion 212 and the bore collar 214 of the first leg 210 may attach to each other and form an engaging face 216 that engages the door 205 when the jig 200 is attached to a first face of the door 205. Similarly, base portion 222 and the bore collar 224 of the second leg 220 may attach to each other and form an engaging face 226 that engages a second face (opposite the first face) of the door 205 when the jig 200 is attached to the door 205. The engaging faces 216 and 226 may extend substantially parallel to each other along opposite faces of the door 205.

In an example embodiment, the bore collars 214 and 224 may be substantially circular structures that form a passage or orifice through the first and second legs 210 and 220, respectively. The passage or orifice may extend in a direction that is substantially perpendicular to parallel planes in which respective ones of the first and second legs 210 and 220 lie. The bore collars 214 and 224 may each have a cylindrical portion 230 and an undercut portion 232, which are best shown in FIG. 8. The cylindrical portion 230 and undercut portion 232 of the first leg 210 may mirror the cylindrical portion 230 and undercut portion 232 of the second leg 220. In an example embodiment, the cylindrical portion 230 may have a consistent nominal diameter (D1) that is slightly larger than the diameter of the hole saw used to cut the handle bore in the door 205. Thus, for example, the nominal diameter (D1) may be about 2 and ⅛ inches in some embodiments. Meanwhile, the undercut portion 232 may extend from the nominal diameter (D1) to an undercut diameter (D2), which is larger than the nominal diameter (D1). In the examples of FIGS. 2-8, the undercut portion 232 defines a linear and relatively smooth transition from the nominal diameter (D1) to the undercut diameter (D2). However, the transition could be non-linear in other cases, and may include a prompt jump in some cases as well.

In an example embodiment, the first and second legs 210 and 220 may be operably coupled to each other by a web or spacing element 240. The spacing element 240 may be disposed between the first and second legs 210 and 212 at a portion of the base portions 212 and 222 that is opposite the bore collars 214 and 224 to provide a variable amount of spacing between the first and second legs 210 and 220. In this regard, the base portions 212 and 222 may include threaded receivers 242 that are reverse threaded relative to each other. Threaded members 245 and 246 may pass through the threaded receivers 242, and at least one of the threaded members 245 and 246 may have an operator 248 disposed at an end thereof. The operator 248 may be rotated by a user of the jig 200 and reverse threading of the threaded members 245 and 246 and the receivers 242 may cause the first and second legs 210 and 220 to move farther apart (i.e., when rotated in one direction) or closer together (i.e., when rotated in the opposite direction). A distance between the spacing element 240 and each of the first and second legs 210 and 220 may be maintained to be substantially equal whether the distance is being increased or decreased.

As can be appreciated from FIGS. 2 and 3, the door 205 may be placed between the first and second legs 210 and 220. The jig 200 may then be aligned to the proper height on the door 205 at an edge 207 of the door 205 that is opposite the hinge assembly of the door 205. The engaging faces 216 and 226 of the first and second legs 210 and 220, respectively, may then be clamped against opposing faces of the door 205 by adjustment of the operator 248. Thus, the jig 200 could be used with doors 205 having different thicknesses (e.g., 1 and ⅜ inches or 1 and ¾ inches).

The spacing element 240 may have an inside face 250, which may be abutted against the edge 207 of the door 205 to define an amount of setback 251 from the edge 207. However, in some cases, in order to allow for different values for the setback 251, a setback adjuster 252 may be provided to be operably coupled to the spacing element 240 to define different amounts of the setback 251. The setback adjuster 252, and structures supporting the setback adjuster 252, may form one example of the backset assembly 140 of FIG. 1.

The setback adjuster 252 may be disposed between the inside face 250 and the edge 207 to define a variable distance (e.g., from zero to a predetermined value) between the inside face 250 and the edge 207. In an example embodiment, the spacing element 240 may have setback selector grooves 254 disposed along longitudinal ends of the spacing element 240. The setback selector grooves 254 may be provided in pairs or as a set of grooves. One set of setback selector grooves 254 may be disposed closer to the edge 207 of the door 205 (and therefore also closer to an inside face 250 of the spacing element 240). Meanwhile, the other set of setback selector grooves 254 may be disposed farther from the inside face 250 (and closer to an outside face 255) of the spacing element 240. The setback adjuster 252 may include a contactor 256, which is configured to contact the edge 207 at a variable distance from the inside face 250. In this example, the contactor 256 is substantially rectangular in shape (e.g., substantially matching a shape of a periphery of the inside face 250). However, the contactor 256 could alternatively have a different shape either generally, or relative to the inside face 250.

The setback adjuster 252 may also include a passage 255 formed through a center of the contactor 256. In other words, the contactor 256 may be hollow in a center thereof, and the hollow portion may form the passage 255. The passage 255 may allow the hole saw used for cutting the edge bore to pass therethrough (while also passing through a corresponding portion of the spacing element 240). The setback adjuster 252 may also include arms 258 that extend perpendicularly away from a plane in which the contactor 256 lies and toward the spacing element 240. The arms 258 may be disposed at opposing longitudinal ends of the contactor 256. Thus, the contactor 256 may have a rectangular shaped peripheral structure that bounds the passage 255 and that lies in a plane. The arms 258 may extend away from opposite longitudinal ends of the contactor 258 out of the plane.

An engagement tab 260 having engagement ridges 262 may be disposed at a distal end of each of the arms 258. The engagement tab 260 may be configured to releasably engage the setback selector grooves 254. In this regard, for example, the engagement ridges 262 may be configured to fit within the setback selector grooves 254. Accordingly, to adjust the amount of setback 251, the engagement tabs 260 may be lifted by the user to remove the engagement ridges 262 from engagement with the setback selector grooves 254. The arms 258 may then be slid (e.g., within slots 264 formed in opposing longitudinal ends of the spacing element 240) to increase or decrease the setback 251 (e.g., as shown by double arrow 266) to align the engagement ridges 262 with a different set of the setback selector grooves 254. The engagement ridges 262 may then settle into the setback selector grooves 254 with which alignment has been achieved to define a different amount of the setback 251. The contactor 256 can therefore be understood to move either closer to or further from the inside face 250 of the spacing element 240 to define the different amounts of setback 251 that are possible by increasing or decreasing the space between the inside face 250 and the edge 207 of the door 205. Of note, although the example of FIGS. 2-8 includes arms 258 that slide through the slots 264, the arms 258 could alternatively slide along the longitudinal ends of the spacing element 240 without including the slots 264. Moreover, it may also be possible to invert the locations of the setback selector grooves 254 and the engagement ridges 262 relative to the arms 258. In this regard, for example, the slots 264 may have a T shaped space formed in the spacing element 240, providing space within the T portion 269 of the T shape for placement of the setback selector grooves 254. The engagement tabs 260 may be operably coupled to engagement ridges 262 that face outwardly (instead of inwardly as described above) and engage the setback selector grooves 254 (that face inwardly) inside the T portion 269. In such an example, the engagement tabs 260 may be pressed inwardly toward each other to enable the increase or decrease of the setback 251.

In an example embodiment, the spacing element 240 may have a substantially rectangular prism shape, with the threaded members 245 and 246 passing through lateral sides of the spacing element 240 in a direction substantially perpendicular to the direction of extension of the slots 264. A edge bore collar 270 may be defined in the spacing element 240 to define a hole through the spacing element 240 through which the hole saw (e.g., a 1 inch hole saw) may cut the bolt/latch bore or edge bore. The edge bore collar 270 may therefore have a diameter (D3) that is slightly larger than the outside diameter of the hole saw that cuts the edge bore. However, many such hole saws have an arbor that may actually have a diameter larger than the hole saw (i.e., larger than one inch). To enable such hole saws to be used with the jig 200 without the arbor hitting and potentially damaging the edge bore collar 270, example embodiments may further include an arbor relief area 272 that extends around the edge bore collar 270 as a recessed portion extending inward from the outside face 244. In this example, the arbor relief area 272 has a larger diameter (D4) than the diameter (D3) of the edge bore collar 270, and extends uniformly at the larger diameter (D4) into the outside face 244 to a predetermined depth. However, other arrangements are also possible, including embodiments in which the diameter of the arbor relief area 272 is non-uniform over its depth.

Although not required, some embodiments may further include a hingedly attached strike plate locator 280. The strike plate locator 280 may have a template area that illustrates locations for screw holes and a latch/bolt slot for a strike plate. The strike plate locator 280 may be hingedly or rotatably attached to one of the legs (e.g., the second leg 220), on an outside surface thereof. The strike plate locator 280 may be attached via an axial rod or protrusions 282 that is pivotable, and also configured to be capable of sliding along retention slots 284 formed on the outside surface of the second leg. The retention slots 284 may be spaced apart from each other by a width of the strike locator plate 280, and may have a length that is at least equal to a distance between the setback selector grooves 254. Thus, when the contactor 256 is moved to change the amount of setback 251, the strike plate locator 280 may also be moved along the retention slots 284 (by sliding the protrusions 282 in the retention slots 284) to make the strike locator plate 280 lie in a same plane as the contactor 256 regardless of where the contactor 256 is positioned. That said, other possible locations for arrangement of the strike locator plate 280 are also possible.

In an example embodiment, a cutting guide apparatus (or device) for guiding placement of bore holes in a door may be provided. The apparatus may include an engagement interface and a backset assembly. The engagement interface may be configured to retain the apparatus proximate to an edge of a door. The engagement interface may include a handle hole guide structure and an edge bore guide structure. The backset assembly may be operably coupled to the engagement interface to enable an amount of backset from the edge of the door to a center of the handle hole guide structure to be adjusted. The engagement interface may include a first leg configured to be disposed along a first face of the door, and a second leg configured to be disposed along a second face of the door. The backset assembly may be configured to engage the edge of the door at a variable location between the first and second legs.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the engagement interface may further include a spacing element disposed between the first and second legs. The spacing element may have an inside face configured to face the edge of the door when the engagement interface is retained proximate the edge of the door. The backset assembly may include a contactor disposed between the inside face and the edge of the door to contact the edge and vary a distance between the edge and the inside face. In an example embodiment, the contactor may include a passage aligned with an axis of the edge bore guide structure such that a hole saw is enabled to pass through both the passage and a guide hole formed by the edge bore guide structure. In some cases, the contactor lies in a first plane substantially parallel to a second plane of the edge of the door, and the contactor includes arms that extend out of the first plane toward the second plane. In an example embodiment, the spacing element may include slots extending along parallel opposing longitudinal ends of the spacing element. The arms may be slidable within the slots to change the distance between the edge and the inside face. In some cases, the spacing element may further include a plurality of selector grooves disposed proximate to the slots, and the selector grooves may extend substantially perpendicular to a direction of extension of the slots. In an example embodiment, the backset assembly may include an engagement tab disposed at a distal end of each of the arms, and the engagement tab may releasably engage one of the selector grooves to define the distance between the edge and the inside face. In some cases, the spacing element may further include a plurality of selector grooves disposed at the opposing longitudinal ends of the spacing element, where the selector grooves extend substantially parallel to a plane in which the inside face lies. In an example embodiment, the backset assembly may include an engagement tab disposed at a distal end of each of the arms. The engagement tab may releasably engage one of the selector grooves to define the distance between the edge and the inside face. In some cases, the engagement tab may include an engagement ridge extending in a direction substantially perpendicular to a direction of extension of the arms, and the engagement ridge may extend into the one of the selector grooves to define the distance between the edge and the inside face. In an example embodiment, the spacing element may be configured to enable adjustment of a distance between the first and second legs. In some cases, the spacing element may be operably coupled to a rotatable operator that is rotated to adjust the distance between the first and second legs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A cutting guide apparatus for guiding placement of bore holes in a door, the apparatus comprising:
an engagement interface configured to retain the apparatus proximate to an edge of a door, the engagement interface comprising a handle hole guide structure and an edge bore guide structure; and
a backset assembly that is operably coupled to the engagement interface to enable an amount of backset from the edge of the door to a center of the handle hole guide structure to be adjusted,
wherein the engagement interface comprises a first leg configured to be disposed along a first face of the door, and a second leg configured to be disposed along a second face of the door,
wherein the backset assembly is configured to engage the edge of the door at a variable location between the first and second legs,
wherein the engagement interface further comprises a spacing element disposed between the first and second legs,
wherein the spacing element has an inside face configured to face the edge of the door when the engagement interface is retained proximate the edge of the door,
wherein the backset assembly comprises a contactor disposed between the inside face and the edge of the door to contact the edge and vary a distance between the edge and the inside face, wherein the contactor comprises a passage aligned with an axis of the edge bore guide structure such that a hole saw is enabled to pass through both the passage and a guide hole formed by the edge bore guide structure, wherein the contactor lies in a first plane substantially parallel to a second plane of the edge of the door, wherein the contactor comprises arms that extend out of the first plane toward the second plane, wherein the spacing element comprises slots extending along parallel opposing longitudinal ends of the spacing element, and wherein the arms are slidable within the slots to change the distance between the edge and the inside face.

2. The apparatus of claim 1, wherein the spacing element further comprises a plurality of selector grooves disposed proximate to the slots, the selector grooves extending substantially perpendicular to a direction of extension of the slots.

3. The apparatus of claim 2, wherein the backset assembly comprises an engagement tab disposed at a distal end of each of the arms, wherein the engagement tab releasably engages one of the selector grooves to define the distance between the edge and the inside face.

4. The apparatus of claim 1, wherein the spacing element further comprises a plurality of selector grooves disposed at the opposing longitudinal ends of the spacing element, the selector grooves extending substantially parallel to a plane in which the inside face lies.

5. The apparatus of claim 4, wherein the backset assembly comprises an engagement tab disposed at a distal end of each of the arms, wherein the engagement tab releasably engages one of the selector grooves to define the distance between the edge and the inside face.

6. The apparatus of claim 5, wherein the engagement tab comprises an engagement ridge extending in a direction substantially perpendicular to a direction of extension of the arms, and wherein the engagement ridge extends into the one of the selector grooves to define the distance between the edge and the inside face.

7. A cutting guide apparatus for guiding placement of bore holes in a door, the apparatus comprising:

an engagement interface configured to retain the apparatus proximate to an edge of a door, the engagement interface comprising a handle hole guide structure and an edge bore guide structure; and a backset assembly that is operably coupled to the engagement interface to enable an amount of backset from the edge of the door to a center of the handle hole guide structure to be adjusted, wherein the engagement interface comprises a first leg configured to be disposed along a first face of the door, and a second leg configured to be disposed along a second face of the door, wherein the backset assembly is configured to engage the edge of the door at a variable location between the first and second legs, wherein the engagement interface further comprises a spacing element disposed between the first and second legs, wherein the spacing element has an inside face configured to face the edge of the door when the engagement interface is retained proximate the edge of the door, wherein the backset assembly comprises a contactor disposed between the inside face and the edge of the door to contact the edge and vary a distance between the edge and the inside face, wherein the spacing element is configured to enable adjustment of a distance between the first and second legs.

8. The apparatus of claim 7, wherein the spacing element is operably coupled to a rotatable operator that is rotated to adjust the distance between the first and second legs.

9. A backset assembly for a cutting guide apparatus configured to guide placement of bore holes in a door, the backset assembly comprising:

a contactor disposed between a first leg and a second leg of the apparatus and proximate to a spacing element that separates the first and second legs, the first leg being configured to be disposed along a first face of the door, and the second leg being configured to be disposed along a second face of the door, the spacing element having an inside face configured to be disposed to face the edge of the door;

a passage formed in a center portion of the contactor and passing through the contactor to enable a hole saw to pass through the passage to cut an edge bore in the door; and arms disposed at opposing edges of the contactor, the arms extending out of a plane in which the contactor lies toward the inside face, wherein the backset assembly is configured to adjust a distance between the edge and the inside face by moving a position of the contactor relative to the inside face, wherein the backset assembly is configured to adjust the distance between the edge and the inside face by selectively engaging the spacing element at respective different locations, wherein the spacing element comprises slots extending along parallel opposing longitudinal ends of the spacing element, and wherein the arms are slidable within the slots to change the distance between the edge and the inside face.

10. The backset assembly of claim 9, wherein the spacing element further comprises a plurality of selector grooves disposed proximate to the slots, the selector grooves extending substantially perpendicular to a direction of extension of the slots.

11. The backset assembly of claim 10, wherein the backset assembly comprises an engagement tab disposed at a distal end of each of the arms, wherein the engagement tab releasably engages one of the selector grooves to define the distance between the edge and the inside face.

12. The backset assembly of claim 9, wherein the spacing element further comprises a plurality of selector grooves disposed at the opposing longitudinal ends of the spacing element, the selector grooves extending substantially parallel to a plane in which the inside face lies.

13. The backset assembly of claim 12, wherein the backset assembly comprises an engagement tab disposed at a distal end of each of the arms, wherein the engagement tab releasably engages one of the selector grooves to define the distance between the edge and the inside face.

14. The backset assembly of claim 13, wherein the engagement tab comprises an engagement ridge extending in a direction substantially perpendicular to a direction of extension of the arms, and wherein the engagement ridge extends into the one of the selector grooves to define the distance between the edge and the inside face.

\* \* \* \* \*